United States Patent [19]
Tejada et al.

[11] Patent Number: 5,952,257
[45] Date of Patent: Sep. 14, 1999

[54] MTW ZEOLITE FOR CRACKING FEEDSTOCK INTO OLEFINS AND ISOPARAFFINS

[75] Inventors: Jorge Tejada, Edo. Miranda; Juan Lujano, Caracas; Yilda Romero, Edo Aragua, all of Venezuela

[73] Assignee: Intevep, S.A., Caracas, Venezuela

[21] Appl. No.: 09/056,576

[22] Filed: Apr. 7, 1998

Related U.S. Application Data

[62] Division of application No. 08/583,568, Jan. 5, 1996, Pat. No. 5,770,040, which is a division of application No. 08/363,413, Dec. 23, 1994, Pat. No. 5,628,978.

[51] Int. Cl.$^6$ ...................................................... B01J 29/06
[52] U.S. Cl. ................... 502/60; 502/64; 502/71; 502/77; 423/705; 423/718; 423/DIG. 33
[58] Field of Search .................................. 502/64, 71, 77, 502/60; 423/705, 718, DIG. 33

[56] References Cited

U.S. PATENT DOCUMENTS 3,832,449  8/1974  Rosinski et al. .......................... 423/328

*Primary Examiner*—Thomas Dunn
*Attorney, Agent, or Firm*—Bachman & LaPointe, P.C.

[57] ABSTRACT

The present invention relates to a zeolite catalyst, a process for using the catalyst for conversion of hydrocarbons, especially naphtha and LPG feedstock, and a process for preparing the catalyst.

3 Claims, 4 Drawing Sheets

MTW ZEOLITE FOR CRACKING FEEDSTOCK INTO OLEFINS AND ISOPARAFFINS

This is a Division of application Ser. No. 08/583,568, filed Jan. 5, 1996 now U.S. Pat. No. 5,770,040, which is a division of application Ser. No. 08/363,413, filed Dec. 23, 1994, now U.S. Pat. No. 5,628,978.

BACKGROUND OF THE INVENTION

The invention relates to a catalyst, particularly to ZSM-12 zeolite catalyst, to a process for preparing such a catalyst, and to a process for conversion of hydrocarbons into olefins and isoparaffins using such a catalyst.

Numerous patents describe the preparation of zeolite and zeolite catalysts which are demonstrated to have catalytic capabilities in the conversion of hydrocarbons to other desired products.

Patents directed to the synthetic preparation of zeolite-type catalysts typically involve the use of directing agents to provide a template for the desired crystalline structure of the zeolite. Even with such directing agents, however, known methods require significant periods of time for crystallization to be completed.

Further, known processes for synthesizing zeolite such as ZSM-12 provide products which are not pure and contain undesirable components such as mordenite, alpha-quartz, other types of zeolite products such as ZSM-5, and cristobalite.

Obviously, it is desirable to provide a process for preparing a catalyst, particularly a zeolite ZSM-12 type catalyst, which yields a pure ZSM-12 composition without undesirable by-products and in shorter periods of time than are required with conventional processes.

It is therefore the primary object of the present invention to provide a process for preparing a ZSM-12 type zeolite catalyst which process has a shorter crystallization time.

It is a further object of the invention to provide a ZSM-12 catalyst having distinct surface area and crystalline structure which help to provide the catalyst with improved selectivity toward desired conversion products such as isoparaffins and olefins.

It is a still further object of the present invention to provide a process for conversion of a hydrocarbon feedstock with the catalyst of the present invention so as to provide a good degree of conversion of n-paraffins and aromatics to desirable end products such as isoparaffins, olefins and the like.

Other objects and advantages will appear hereinbelow.

SUMMARY OF THE INVENTION

The foregoing objects and advantages are readily attained by the presently disclosed invention.

In accordance with the invention, a zeolite catalyst is provided having a crystalline aluminosilicate structure characterized by an x-ray diffraction pattern as follows:

| Interplanar Spacing D(Å) | Relative Intensity (I/I$_o$) |
|---|---|
| 12.09 | M |
| 11.26 | W |
| 10.15 | W |
| 9.81 | W |
| 7.48 | W |
| 6.09 | W |
| 4.77 | W |
| 4.73 | W |
| 4.30 | VS |
| 3.99 | W |
| 3.87 | VS |
| 3.73 | M |
| 3.66 | W |
| 3.50 | M |
| 3.38 | M |
| 3.21 | W |
| 3.06 | W |

In further accordance with the invention, the catalyst preferably has a surface area of greater than or equal to about 300 m$^2$/g, and has an average particle size of less than or equal to about 1 micron.

The process according to the invention for preparing MTW zeolite catalyst comprises the steps of forming a mixture comprising silica, alumina, water, a source of alkali metal, and a source of tetraethylammonium cation, wherein said mixture exhibits a composition in terms of mole ratios as follows:

| | |
|---|---|
| SiO$_2$/Al$_2$O$_3$ | >120 |
| TEA$^+$/SiO$_2$ | 0.2–0.7 |
| H$_2$O/SiO$_2$ | 20–300 |
| OH$^-$/SiO$_2$ | 0.4–0.7 | wherein TEA$^+$ is said tetraethylammonium cation; and maintaining said mixture at an elevated temperature so as to provide a crystalline aluminosilicate.

In further accordance with the invention, hydrocarbon feedstock such as light or heavy naphtha, LPG and the like may be treated using the catalyst according to the invention so as to convert n-paraffins and aromatics to desirable final products having increased fractions of isoparaffins and olefins.

BRIEF DESCRIPTION OF THE DRAWINGS

A detailed description of preferred embodiments of the invention follows, with reference to the attached drawings wherein.

DETAILED DESCRIPTION

Figure 1:
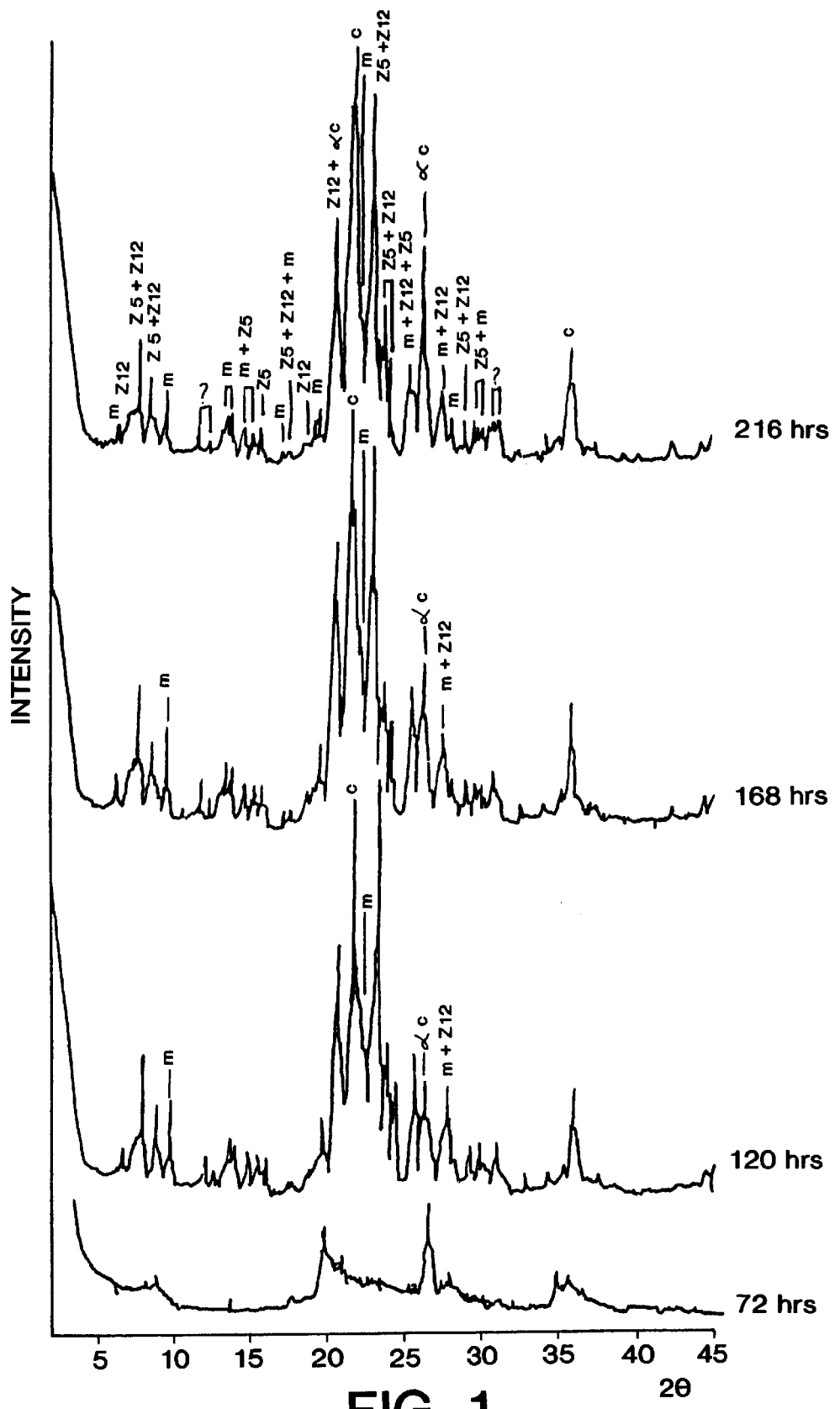
FIG. 1 illustrates the x-ray diffraction patterns for the crystalline composition of Example 1 at crystallization times of 72, 120, 168 and 216 hours.

The invention relates to a zeolite catalyst, particularly a ZSM-12 type zeolite catalyst which will be referred to herein as MTW zeolite, which has a particular crystalline structure operative in accordance with the invention to provide the catalyst with excellent activity and selectivity toward reactions such as catalytic cracking of n-paraffins and conversion of aromatics which provide desired fractions of isoparaffins and olefins in accordance with the invention. The invention further relates to a process for preparing MTW zeolite according to the invention, which process provides pure MTW zeolite crystals in shorter crystallization times than conventional zeolite synthesis processes. The invention still further relates to a process for conversion of feedstocks such as light and heavy naphtha, LPG, and feedstocks having large fractions of n-paraffins and aromatics using the zeolite in accordance with the invention to provide end products having increased fractions of the desired isoparaffins and olefins.

The MTW zeolite catalyst of the present invention is a crystalline aluminosilicate structure characterized by an x-ray diffraction pattern as set forth in Table I below:

TABLE 1

| Interplanar Spacing D(Å) | Relative Intensity $(I/I_o)$ |
|---|---|
| 12.09 | M |
| 11.26 | W |
| 10.15 | W |
| 9.81 | W |
| 7.48 | W |
| 6.09 | W |
| 4.77 | W |
| 4.73 | W |
| 4.30 | VS |
| 3.99 | W |
| 3.87 | VS |
| 3.73 | M |
| 3.66 | W |
| 3.50 | M |
| 3.38 | M |
| 3.21 | W |
| 3.06 | W |

The catalyst is further characterized in terms of crystalline structure by a surface area of greater than or equal to about 300 m$^2$/g, and an average particle size of less than or equal to about 1 micron. The aforedescribed catalyst characteristics in combination are believed to be responsible for providing the desirable activity and selectivity of the MTW zeolite in accordance with the invention.

In further accordance with the invention, the MTW zeolite according to the invention is prepared utilizing a particular organic agent as a directing agent or template, and further by manipulating the OH$^-$/SiO$_2$ and TEA$^+$/SiO$_2$ ratios so as to provide conditions wherein pure MTW zeolite crystals are provided in reduced preparation or crystallization times typically in the range of less than or equal to about 48 hours.

In accordance with the invention, the zeolite is prepared by providing a mixture which includes silica, alumina, water, a source of alkali metal, and a source of tetraethylammonium cation, wherein the mixture has a composition in terms of mole ratios as follows:

| RATIO | BROAD RANGE | PREFERRED RANGE |
|---|---|---|
| SiO$_2$/Al$_2$O$_3$ | >120 | >200 |
| M/(TEA$^+$ + M) | 0.2–0.95 | 0.3–0.8 |
| TEA$^+$/SiO$_2$ | 0.2–0.7 | 0.4–0.6 |
| H$_2$O/SiO$_2$ | 20–300 | 30–100 |
| OH$^-$/SiO$_2$ | 0.4–0.7 | 0.55–0.65 |

In the above, TEA$^+$ represents tetraethylammonium cation, and M is an alkali metal, preferably sodium.

It should also be noted that in accordance with the invention it is further preferable still to maintain the ratio of M/(TEA$^+$+M) between about 0.4–0.7.

The silica and alkali metal may be provided together according to the invention in the form of an aqueous solution of an alkali metal silicate compound.

Alumina may be provided in an aqueous solution of an aluminum salt such as aluminum nitrate or the like.

The source of tetraethylammonium cation may suitably be a solution of tetraethylammonium hydroxide.

The aforementioned mixture may preferably be formed in accordance with the invention by providing an aqueous solution of sodium silicate, to which is added the solution of tetraethylammonium hydroxide and aqueous solution of aluminum nitrate, so as to provide the desired mixture and mole ratios.

In accordance with the invention, it has been found that the ratio of TEA$^+$/SiO$_2$ and the ratio of OH$^-$/SiO$_2$ are critical in combination with the particular organic agent (TEA$^+$) in providing pure MTW zeolite having the desired surface area, particle size and x-ray diffraction pattern and providing crystallization of the MTW zeolite in less time.

The OH$^-$/SiO$_2$ ratio may be adjusted within the desired range according to the invention by adding one or more acids such as H$_2$SO$_4$, mineral acid, or any other readily available acid to the mixture. As set forth in the examples hereinbelow, an ideal OH$^-$/SiO$_2$ ratio has been found to be approximately 0.61, as this ratio in combination with the preferred organic agent provides a pure MTW zeolite in a surprisingly shorter amount of time than is normally required. Further, excellent results are obtained in accordance with the invention by preparing the crystallization mixture so as to initially provide a mole ratio of OH$^-$/SiO$_2$ greater than about 0.65, and subsequently adding a suitable acid to reduce the OH$^-$/SiO$_2$ ratio to about 0.61. It is believed that maintaining the OH$^-$/SiO$_2$ ratio within the ranges set forth according to the invention serves to maintain the pH of the mixture at a value which encourages formation of the desired type of crystals.

The mixture is then subjected to an elevated temperature for a sufficient period of time so as to provide a crystalline aluminosilicate which possesses the critical x-ray diffraction pattern, surface area and particle size as set forth above. Crystallization may be carried out using a stainless steel autoclave, which should be filled to approximately 50–80% by volume with the mixture, or using any other suitable equipment known in the art.

Crystallization is preferably carried out at a temperature between about 150° C. to about 170° C., under either static or stirred conditions. If the vessel in which crystallization is carried out permits stirring, stirring is preferred as crystallization is generally affected in less time under stirring conditions. In accordance with the invention, crystallization is typically achieved within a time period of less than or equal to about 48 hours, which is a marked improvement over conventional processes.

The aluminosilicate crystals so obtained are then preferably filtered and washed, preferably with water, until a neutral or substantially neutral pH is obtained. The washed crystals are then dried in a stove or other drying apparatus at a temperature of about 120° C. for a period of about 6–12 hours.

The MTW zeolite prepared in accordance with the foregoing process may then be treated using conventional exchange techniques, if desired, so as to replace the original cations of the catalyst with any desired active metals such as, for example, other alkali metals, alkaline earth metals, or any other metal suitable for providing activity toward a desired reaction. Numerous techniques for providing the catalyst with the desired active metal are of course known in the art and may be used in accordance with the invention. For example, the zeolite may be contacted or impregnated with a salt solution containing the desired replacing cation. A wide variety of salts may be used to provide the solutions such as nitrates, chlorides, sulfates and the like.

After any desired exchange techniques, the zeolite is then preferably washed with water and again dried at a temperature of about 110–120° C. for a period of between about 6–12 hours.

The catalyst is then preferably calcined at a suitable calcination temperature preferably between about 500–800° C. for a period of between about 2 to about 30 hours, preferably about 2½ hours, all in accordance with conventional techniques, so as to provide the desired activated catalyst suitable for use in treating hydrocarbon feedstocks in cracking, conversion, and other refining processes.

The MTW zeolite according to the invention may be utilized in various shapes or forms such as granules, powder, or molded/extruded product. The desired shape is typically dictated by the type of process in which the catalyst is to be used. Selection of the proper form is within the abilities of one skilled in the art. For example, in micro-reactor tests, the catalyst is employed in the form of a powder. In microactivity tests (MAT) for FCC processes, the catalyst is provided in granules of 40–80 micron size, and for hydrotreating, extruded catalyst is provided.

Prior to use in cracking or conversion processes, the zeolite catalyst can be further activated by treating the catalyst with a nitrogen flow, preferably approximately 3.6 liters per hour per gram, at a temperature of about 400–500° C. for a period of about 2–10 hours.

In further accordance with the invention, a process is provided for treating a hydrocarbon feedstock with the catalyst of the present invention so as to provide desired isoparaffin and olefin products. Preferred process feedstocks include $C_2$–$C_4$ LPG feedstocks and $C_2$–$C_{15}$ hydrocarbon feedstocks containing n-paraffins and/or aromatics. Particularly suitable are light and heavy virgin naphthas containing n-paraffins and having a boiling point of between about 36.7 to about 201.7° C. The n-paraffins preferably have between 2 to 15 carbon atoms, and aromatics preferably have from 7 to 10 carbon atoms.

According to the invention, n-paraffins, aromatics and other fractions of the feedstock are converted or cracked so as to provide desired end products including isoparaffins and olefins. The catalyst and process according to the invention provide an excellent conversion rate and selectivity toward the desired products and also exhibit improved stability as compared to conventional ZSM-12.

In accordance with the invention, preferable conversion conditions include a temperature of between about 400–550° C. and a space velocity in the range of about 10 to about 250 $h^{-1}$. The feedstock is contacted with a catalyst according to the present invention having a surface area of greater than or equal to about 300 $m^2$/g, average particle size of less than or equal to about 1 micron, and an x-ray diffraction pattern as set forth above in Table 1, so as to provide transformation of significant portions of the feedstock to isoparaffins such as isobutylene, isobutane, isopentane and the like, and olefins.

Thus disclosed in accordance with the invention is a catalyst, a process for preparing the catalyst, and a process for treating hydrocarbons with the catalyst. The MTW zeolite of the present invention is provided in shortened crystallization times, without formation of undesirable products such as mordenite, cristobalite, and other types of zeolite such as ZSM-5.

Further, the catalyst provided according to the invention has a particular crystalline structure which provides excellent results in accordance with the conversion process of the present invention.

The following examples further demonstrate the advantages of the catalyst, process for preparing the catalyst, and process for conversion in accordance with the invention.

EXAMPLE 1

This example illustrates the substantial time required for crystallization utilizing a conventional synthesis process. This example further demonstrates the undesirable by-products which are conventionally formed along with the ZSM-12 zeolite.

73.1 g sodium silicate were mixed with 62.4 ml of distilled water. The following components were then added, in the order given, under agitation as follows:

87.8 ml of a 20% solution of TEAOH;

1.14 g $Al(NO_3)_3 \cdot 9H_2O$ in 24 ml of water; and 2.0 ml of sulfuric acid.

The mixture of the foregoing ingredients provides the mixture with a composition in terms of mole ratios as follows:

| | |
|---|---|
| $SiO_2/Al_2O_3$ | 246 |
| $Na^+/(TEA^+ + Na^+)$ | 0.59 |
| $H_2O/SiO_2$ | 36 |
| $OH^-/SiO_2$ | 0.76 |
| $Na^+/SiO_2$ | 0.6 |
| $TEA^+/SiO_2$ | 0.41 |

The foregoing mixture was then placed in a stainless steel autoclave, and subjected to a temperature of 160° C. under static conditions.

After 72 hours had elapsed, crystallization had begun. Samples were obtained and analyzed with x-ray diffraction of the product after 72 hours, 120 hours, 168 hours and 216 hours. The samples obtained at the foregoing times were filtered and washed with distilled water until a neutral pH was attained, and then dried at 120° C. for one night.

The corresponding diffraction patterns are illustrated in FIG. 1. As shown in FIG. 1, a mixture of discrete phases is obtained which includes cristobalite, alpha/quartz, ZSM-5, mordenite and ZSM-12. Table 2 set forth below further summarizes the results of this test.

TABLE 2

| Crystallization Time (h) | Products Obtained |
| --- | --- |
| 72 | Mordenite, alpha-quartz |
| 120 | Mordenite, ZSM-5, MTW, Cristobalite, alpha-quartz |
| 168 | Mordenite, ZSM-5, MTW, Cristobalite, alpha-quartz |
| 216 | Mordenite, ZSM-5, MTW, Cristobalite, alpha-quartz |

As shown, at no point did the conventional process yield a pure ZSM-12 product.

EXAMPLE 2

In this example, preparations 2–4 are formulated utilizing additional amounts of tetraethylammonium resulting in increased ratios of $OH^-/SiO_2$.

9.8 ml of distilled water were mixed with 9.91 g of sodium silicate. Then, under continuous agitation, each preparation was prepared through addition of the following ingredients under continuous agitation.

Preparation 2 was prepared by further adding 9.9 ml of 20% TEAOH solution, while preparations 3 and 4 were prepared using 12.3 and 16.5 ml respectively, of 20% TEAOH solution. As shown in Table 2, this results in an increase in the ratio $TEA^+/SiO_2$. To each preparation, 0.18 g of $Al(NO_3)_3$ mixed with 3.7 ml of water and 0.3 ml of sulfuric acid were added so as to provide mixtures for each preparation having composition in terms of mole ratios as set forth below in Table 3.

TABLE 3

| RATIO | PREP 2 | PREP 3 | PREP 4 |
| --- | --- | --- | --- |
| $OH^-/SiO_2$ | 0.60 | 0.68 | 0.84 |
| $SiO_2/Al_2O_3$ | 208 | 208 | 208 |
| $Na^+/SiO_2$ | 0.6 | 0.6 | 0.6 |
| $H_2O/SiO_2$ | 31 | 34 | 39 |
| $TEA^+/SiO_2$ | 0.25 | 0.32 | 0.49 |
| $Na^+/(TEA^+ + Na^+)$ | 0.71 | 0.65 | 0.55 |

Figure 2:
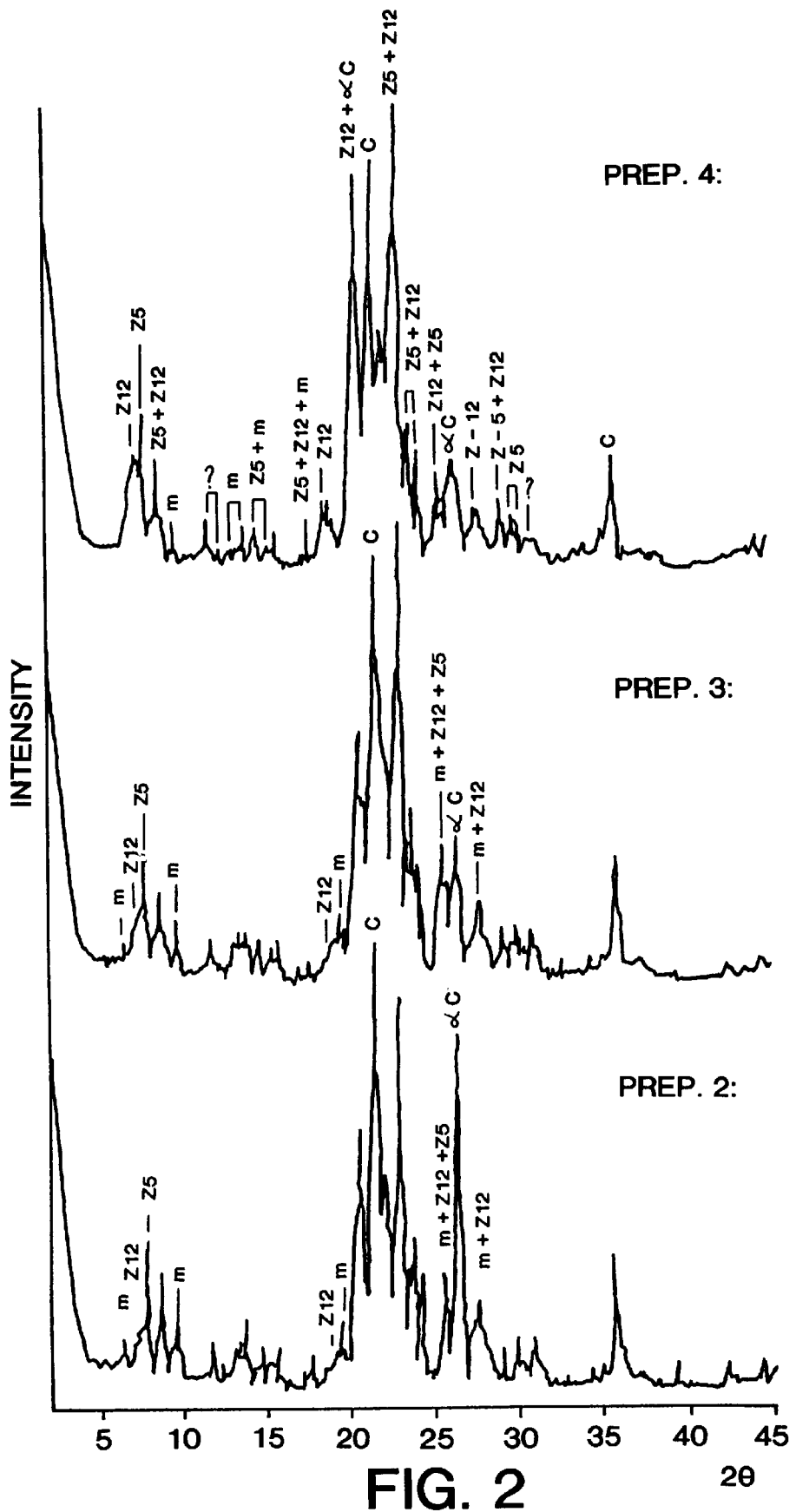
FIG. 2 illustrates the x-ray diffraction patterns of the three preparations of Example 2.

Preparations 2–4 were then held at 160° C. for a period of 96 hours under static conditions. Samples of each preparation were then filtered, washed and dried, and then analyzed with x-ray diffraction. The resulting patterns are shown in FIG. 2, and the compositions of the resulting product are listed below in Table 4.

TABLE 4

| | $TEA^+/SiO_2$ | $Na^+/TEA^+ + Na^+$ | Alpha-Quartz | XRD Intensity | | | |
| --- | --- | --- | --- | --- | --- | --- | --- |
| | | | | Cristobalite | ZSM5 | MTW | Mordenite |
| Prep #2 | 0.25 | 0.71 | S | VS | W | W | W |
| Prep #3 | 0.32 | 0.65 | M | VS | M | M | VW |
| Prep #4 | 0.49 | 0.55 | W | VS | VS | VS | VW |

As shown in Table 4, the undesirable mordenite content of the final product decreases as the content of $TEA^+$ increases (and the ratio $TEA^+/SiO_2$ increases). Alpha-quartz also decreases drastically with the increase in $TEA^+$, and the fraction of MTW, desirably, increases. However, production of ZSM-5 also increases.

EXAMPLE 3

In this example, a preparation similar to preparation 4 of Example 2 was prepared, with the exception that additional sulfuric acid was included in the mixture so as to reduce the ratio $OH^-/SiO_2$. The preparation (Preparation No. 5) was made as follows:

9.8 ml of distilled water were mixed with 9.91 g of sodium silicate.

Then, under vigorous agitation, the various reactants were added as follows: 16.5 ml of a 20% TEAOH solution were mixed with the sodium silicate solution, followed by the addition of a solution of 0.18 g of $Al(NO_3)_3.9H_2O$ in 3.7 ml of water, followed by 0.6 ml of sulfuric acid to reduce the ratio $OH^-/SiO_2$. The resulting mixture had a composition in terms of mole ratios as follows:

TABLE 5

| RATIO | PREP #5 |
| --- | --- |
| $OH^-/SiO_2$ | 0.61 |
| $SiO_2/Al_2O_3$ | 208 |
| $Na^+/SiO_2$ | 0.6 |
| $H_2O/SiO_2$ | 39 |
| $TEA^+/SiO_2$ | 0.49 |
| $Na^+/(TEA^+ + Na^+)$ | 0.55 |

As illustrated, the addition of sulfuric acid in the proportion chosen resulted in the ratio $TEA^+/SiO_2$ remaining at the elevated level of 0.49 (See preparation 4), but lowered the ratio $OH^-/SiO_2$ to 0.61. The mixture was then subjected to elevated temperature of 160° C., as in Example 2.

Figure 3:
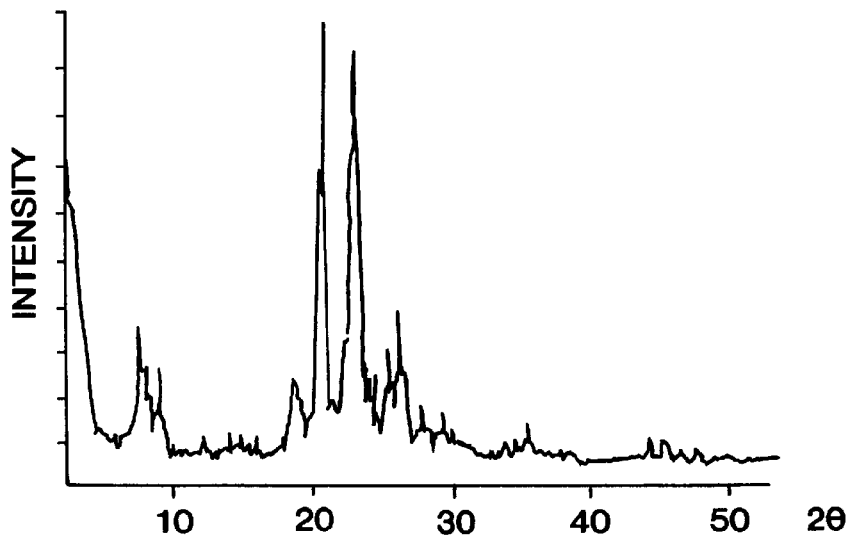
FIG. 3 illustrates the x-ray diffraction pattern of a catalyst prepared in accordance with the present invention and particularly as prepared in Example 4.

Crystals were present after just 48 hours. The solid crystalline substance so obtained was washed and dried as set forth in Example 2 and analyzed with x-ray diffraction. As shown in FIG. 3 a pure zeolite MTW product was obtained. Further the pure zeolite MTW product was characterized by the d-spacing particular to ZSM-12 zeolite according to the invention as set forth above in Table 1.

Preparation of the MTW zeolite in accordance with the process of the present invention serves to substantially eliminate the formation of undesired mordenite, cristobalite, and other zeolite phases such as ZSM-5, and also drastically reduces the necessary crystallization time.

EXAMPLE 4

This example was conducted using tetrapropylammonium (TPAOH) rather than TEAOH. 9.8 ml. of distilled water were added to 9.91 grams of sodium silicate. The following reactants were then added, in the order given under agitation of the formed silicate suspension.

24 ml. of a 20% (wt) solution of TPAOH;

a solution of 0.18 g of $Al(NO_3)_3.9H_2O$ in 3.7 ml. of water;

sulfuric acid until an $OH^-/SiO_2$ ratio of 0.61 was obtained.

The procedure was the same as Example 3, the crystallization time was 48 hours and the ratio $H_2O/SiO_2$ was 39.

The resulting mixture exhibited the following composition in terms of mole ratios:

| RATIO | PREP #5 |
|---|---|
| $OH^-/SiO_2$ | 0.61 |
| $SiO_2/Al_2O_3$ | 208 |
| $Na^+/SiO_2$ | 0.6 |
| $H_2O/SiO_2$ | 39 |
| $TPA^+/SiO_2$ | 0.49 |

After 48 hours, the crystallized solid was analyzed through X-ray diffraction according to the above mentioned conditions. The solid obtained was a ZSM-5 zeolite. Thus, TPAOH does not yield the same pure MTW zeolite according to the invention as does TEAOH.

EXAMPLE 5

This example was conducted using tetramethylammonium (TMAOH) rather than TEAOH. 9.8 ml of distilled water were added to 9.91 grams of sodium silicate. The following reactants were then added, in the order given, under agitation of the formed silicate suspension.

10.7 ml. of a 20% (wt) solution of TMAOH;
a solution of 0.18 g of $Al(NO_3)_3.9H_2O$ in 3.7 ml. of water;
sulfuric acid until a $OH^-/SiO_2$ ratio of 0.61 was obtained.

The procedure was the same as Example 3, the crystallization time was 48 hours and the ratio $H_2O/SiO_2$ was 39. The resulting mixture exhibited the following composition in terms of mole ratios:

| RATIO | PREP #5 |
|---|---|
| $OH^-/SiO_2$ | 0.61 |
| $SiO_2/Al_2O_3$ | 208 |
| $Na^+/SiO_2$ | 0.6 |
| $H_2O/SiO_2$ | 39 |
| $TMA^+/SiO_2$ | 0.49 |

The obtained solid was analyzed through X-ray diffraction according to the above mentioned conditions. The solid obtained was amorphous. Examples 4 and 5 illustrate the criticality of the claimed $TEA^+$ organic agent in combination with the ratios $OH^-/SiO_2$ and $TEA^+/SiO_2$ in providing the MTW zeolite according to the invention.

EXAMPLE 6

This example illustrates the selectivity of catalyst in accordance with the present invention when used in accordance with the conversion process of the present invention to treat a test feedstock for conversion of n-heptane. The feedstock was a heavy virgin naphtha feedstock which was hydrotreated and showed the following composition under simulated distillation:

| | % WT |
|---|---|
| $C_4$ | 0.70 |
| $C_5$ | 1.70 |
| $C_6$ | 8.84 |
| $C_7$ | 26.81 |
| $C_8$ | 25.35 |
| $C_9$ | 20.24 |
| $C_{10}$ | 12.36 |
| $C_{11}$ | 2.66 |
| $C_{12} + C_{13}$ | 1.19 |
| $C_{13}+$ | 0.16 |
| Sulphur | <100 ppm |
| Nitrogen | 36 ppm |
| IBP | 109.6° C. |
| FBP | 201.7° C. |

A portion of zeolite as prepared in Example 3 (Preparation 5) was provided having a weight of 0.060 g. The zeolite was pre-treated at 500° C. under a flow of nitrogen of 3.6 liters/hr. for 2 hours. The catalyst sample was then contacted with a test feedstock of n-heptane under operating conditions including a temperature of 460° C., a feed rate of 16.5 ml per hour of n-heptane, and under a further feed of 1.6 liters of nitrogen per hour. The reaction was carried out in hydrocarbon injection pulses of 30 seconds. Table 6 illustrates the conversion and selectivity of the catalyst of preparation 5 for pulses 1–4.

TABLE 6

| Number of Pulse | 1 | 2 | 3 | 4 |
|---|---|---|---|---|
| Time (s) | 30 | 60 | 90 | 120 |
| Conversion (% wt) | 24.6 | 25.0 | 28.5 | 30 |
| Distribution of hydrocarbons (% wt) | | | | |
| $C_2 + C_2=$ | 0.4 | 0.5 | 0.4 | 0.4 |
| $C_3=$ | 21.2 | 21.5 | 22.0 | 20.8 |
| $C_3$ | 24.9 | 24.5 | 24.0 | 24.0 |
| $iC_4=$ | 14.4 | 14.2 | 14.6 | 14.5 |
| $iC_4$ | 20.8 | 20.0 | 19.4 | 19.7 |
| $nC_4$ | 10.0 | 10.2 | 10.7 | 10.3 |
| $iC_5$ | 1.3 | 0.8 | 1.2 | 1.4 |
| $nC_5$ | 1.0 | 1.2 | 1.0 | 1.3 |
| $C_5=$ | 0.8 | 0.9 | 1.1 | 1.3 |
| Olefins, $iC_4$, $iC_5$ (% wt) | 63.7 | 63.6 | 63.9 | 64.0 |
| Hydrocarbons $C_6^+$ not detected | | | | |

As shown, the catalyst according to the present invention exhibits excellent conversion rates and selectivity to isoparaffins as desired.

Figure 4:
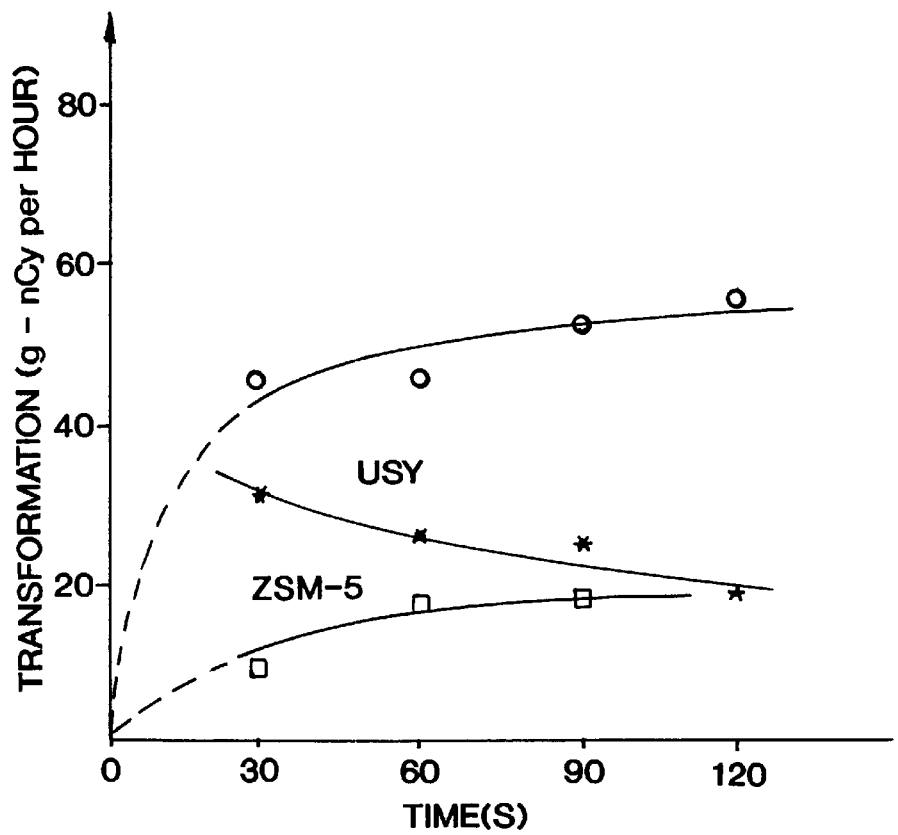
FIG. 4 compares the activity in transformation of n-heptane of three catalysts, namely ZSM-5 zeolite, USY zeolite, and MTW zeolite catalyst of the present invention.

FIG. 4 compares the activity of the preparation 5 catalyst in accordance with the invention to that of zeolite USY and ZSM-5 in terms of the activity or selectivity toward transformation of n-heptane. As shown, the activity toward transformation of n-heptane is higher for the MTW catalyst according to the present invention than for the compared conventional zeolite USY and ZSM-5.

Figure 5:
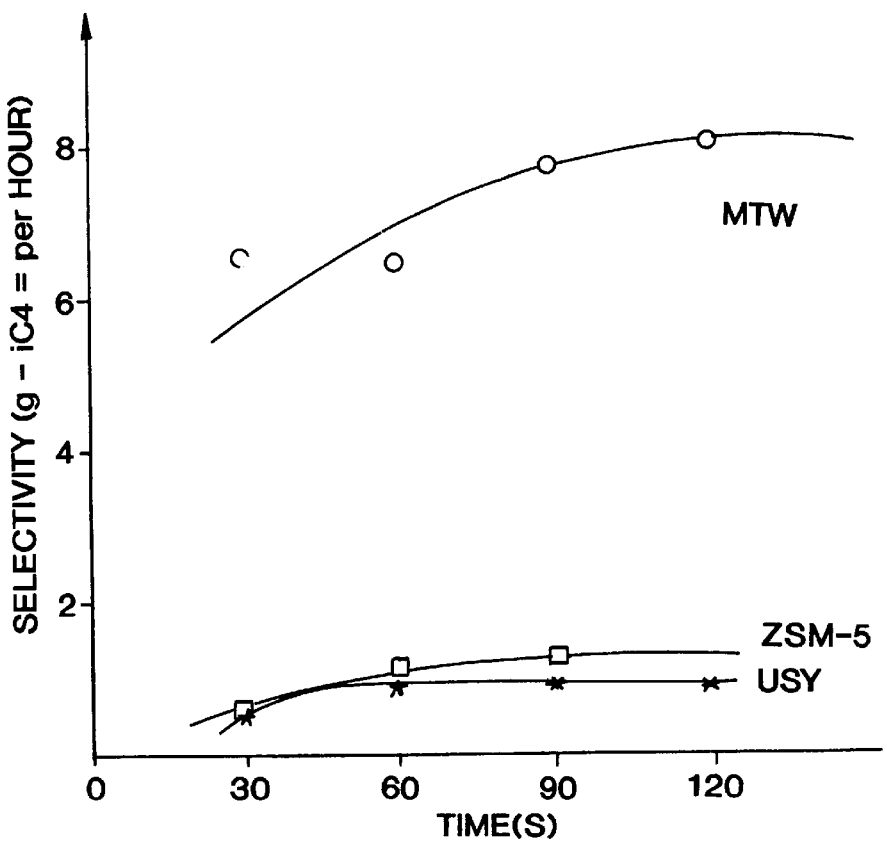
FIG. 5 illustrates the selectivity for isobutylene of three catalysts, namely ZSM-5, USY and MTW zeolite catalyst of the present invention.

Similar tests were carried out comparing selectivity of the MTW zeolite according to the present invention toward isobutylene as compared to zeolite USY and ZSM-5. FIG. 5 illustrates the selectivity toward isobutylene for each of these zeolites. As shown, the MTW zeolite of the present invention has a much greater selectivity toward isobutylene as desired.

Figure 6:
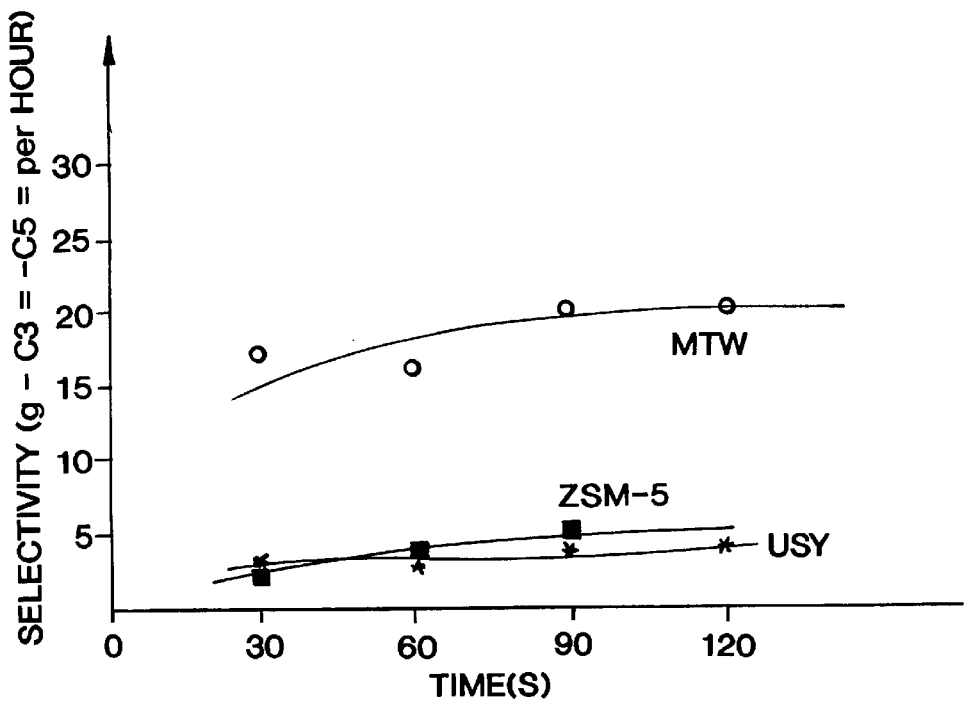
FIG. 6 illustrates the selectivity toward C$_3$–C$_5$ olefins of ZSM-5 zeolite, USY zeolite, and the MTW zeolite of the present invention.

Finally, the MTW zeolite of the present invention was compared to conventional zeolite USY and ZSM-5 in terms of selectivity toward C3–C5 olefins. FIG. 6 illustrates the comparison, which shows that the MTW zeolite according to the invention has an improved selectivity toward the desired olefins.

EXAMPLE 7

In this example, 0.060 grams of a conventional ZSM-12 zeolite were tested under the same conditions with n-heptane as used in Example 6 to provide a comparison to the MTW zeolite according to the invention. The conventional ZSM-12 had a surface area of 220 m²/g and a particle size of 5–6 microns. The results of the test are set forth below in Table 7.

TABLE 7

| Number of Pulse | 1 | 2 | 3 | 4 |
|---|---|---|---|---|
| Time (s) | 30 | 60 | 90 | 120 |
| Conversion (% wt) | 12 | 8 | 2 | 0 |
| Distribution of hydrocarbons (% wt) | | | | |
| $C_2 + C_2=$ | 3.2 | 5.5 | traces | — |
| $C_3=$ | 9.0 | 10.2 | 8.0 | — |
| $C_3$ | 42.7 | 33.1 | 41.0 | — |
| $iC_4=$ | 1.8 | 2.3 | 1.0 | — |
| $iC_4$ | 18.8 | 13.3 | 8.2 | — |
| $nC_4$ | 12.9 | 13.2 | 7.8 | — |
| $C_4=$ | 4.7 | 12.3 | 27.4 | — |
| $iC_5$ | 1.0 | 1.5 | traces | — |
| $nC_5$ | 3.4 | 5.8 | 3.9 | — |
| $c_5=$ | 2.5 | 2.8 | 2.7 | — |
| Olefins, $iC_4$, $iC_5$ (% wt) | 37.8 | 42.4 | 47.3 | 0 |

A comparison of Tables 6 and 7 shows that the MTW zeolite according to the invention has improved activity, selectivity, and stability as compared to the conventional ZSM-12 zeolite.

EXAMPLE 8

This example illustrates the effect of changes in process temperature on the conversion of n-heptane with a catalyst according to the invention. 0.120 g of calcined zeolite (Preparation 5) were contacted with n-heptane at temperatures of 380° C., 420° C. and 460° C. The flow rate was 0.1126 moles per hour of n-heptane and 1.6 liters per hour of nitrogen. Table 8 illustrates the activity of the catalyst at these temperatures taken at a pulse of 30 seconds.

TABLE 8

| | Temperature | | |
|---|---|---|---|
| | 380° C. | 420° C. | 460° C. |
| Activity (g n-$C_7$/g/h) | 8.8 | 10.0 | 37.1 |
| Distribution of hydrocarbons (% wt) | | | |
| $C_2=$ | — | — | 1.0 |
| $C_2$ | 0.4 | — | 1.0 |
| $C_3$ | 20.0 | 24.0 | 21.8 |
| $C_3=$ | 26.0 | 29.0 | 30.7 |
| $iC_4$ | 23.4 | 19.0 | 12.8 |
| $iC_4=$ | 15.1 | 15.5 | 13.5 |
| $nC_4$ | 6.6 | 9.5 | 11.0 |
| $C_4=$ | 8.5 | 3.0 | 6.4 |
| $C_5+$ | — | — | 1.8 |
| Olefins, $iC_4$ (% wt) | 72.6 | 66.5 | 64.4 |
| Hydrocarbons $C_6^+$ not detected | | | |
| WHSV = 94 h$^{-1}$ | | | |

EXAMPLE 9

This example illustrates the activity of MTW zeolite according to the invention (Preparation 5) when contacted with n-decane. 0.060 g of the preparation 5 zeolite were contacted with a feedstock of n-decane under identical reaction conditions to those set forth in Example 6. The results of this test are set forth in Table 9.

TABLE 9

| Number of Pulse | 1 | 2 | 3 |
|---|---|---|---|
| Time (s) | 30 | 60 | 120 |
| Conversion (% wt) | 34.0 | 73.0 | 54.0 |
| Distribution of hydrocarbons (% wt) | | | |
| $C_2 + C_2=$ | 0.3 | 1.0 | 0.8 |
| $C_3 + C_3=$ | 11.2 | 21.6 | 19.5 |
| $iC_4$ | 24.1 | 14.6 | 11.6 |
| $iC_4=$ | 11.2 | 0.2 | 10.0 |
| $nC_4$ | 4.4 | 13.0 | 8.3 |
| $C_4=$ | 2.4 | 2.5 | 6.5 |
| $iC_5 + iC_5=$ | 13.2 | 6.2 | 6.0 |
| $nC_5$ | 10.3 | 8.7 | 6.0 |
| $C_5=$ | 4.7 | 5.8 | 7.1 |
| $C_6^+$ | 18.2 | 17.4 | 24.2 |
| Aromatics (% wt) | 0.6 | 1.0 | 1.9 |

EXAMPLE 10

This example illustrates the use of MTW zeolite according to the invention in cracking a light virgin naphtha (36.7–109° C.).

0.120 g of MTW zeolite (preparation 5) were contacted with a light virgin naphtha feedstock having a boiling point range 36.7–109° C. under the reaction conditions as set forth above in Example 6, except that the feedstock space velocity was 38h$^{-1}$. The feedstock had a composition as follows:

| | % WT |
|---|---|
| $C_4$ | 0.97 |
| $C_5$ | 62.60 |
| $C_6$ | 25.45 |
| $C_7$ | 9.88 |
| $C_8$ | 1.02 |
| $C_9$ | 0.07 |
| Sulphur | 18 ppm |
| IBP | 36.7° C. |
| FBP | 109° C. |

The results are set forth below in Table 10.

TABLE 10

| Distribution of Hydrocarbons (% wt) | |
|---|---|
| Conversion | 60 |
| $C_2, C_2=$ | 1.0 |
| $C_3, C_3=$ | 10.5 |
| $iC_4$ | 6.4 |
| $iC_4=$ | 1.3 |
| $nC_4$ | 13.0 |
| $C_4=$ | 1.0 |
| $iC_5$ | 16.0 |
| $nC_5$ | 18.0 |
| $C_5=$ | 0.3 |
| $iC_6$ | 14.4 |
| $nC_6$ | 7.5 |
| Naphtha $C_5$–$C_7$ | 6.0 |
| $iC_7, iC_8$ | 2.4 |
| $nC_7$ | 1.0 |
| Aromatics | 1.2 |

EXAMPLE 11

1.00 g of the calcined zeolite of Example 6 was tested with propane at temperatures of 480° C. and 530° C. The flow of $N_2$-propane was 13 cc/minute and the mole ratio $N_2$:propane was 9:1. The results of the test are shown in Table 11 (at t=5 minutes).

TABLE 11

| | Temperature (°C.) | |
|---|---|---|
| | 480 | 530 |
| Conversion (% wt) | 60 | 85 |
| Methane + CO | 18.6 | 26.5 |
| Ethane | 24.0 | 17.2 |
| Ethylene | 24.6 | 21.3 |
| Propylene | 5.0 | 8.9 |
| $C_4$–$C_6$ | 20.4 | 10.2 |
| Paraffins, $C_9$ | 1.8 | 3.0 |
| BT | 3.6 | 6.6 |
| Aromatics $C_9$+ | 2.0 | 6.3 |

This example shows that the MTW zeolite has excellent activity and selectivity in the conversion and cracking of LPG into desirable end products like light olefins and isoparaffins.

EXAMPLE 12

This example shows the activity of catalyst in accordance with the present invention when used to treat a feedstock of meta-xylene. The example also shows the activity, under the same conditions, of a conventional ZSM-12 zeolite having a surface area of 220 m²/g and a particle size of 5–6 microns in treating the same feedstock under the same conditions.

0.060 g of the MTW zeolite of Example 6 were pretreated under a flow of $N_2$ of 3 l/h overnight at 450° C. The temperature was decreased to 350° C. for the conversion process.

The zeolite was contacted with the feedstock under a flow rate of 3.75 ml/h of meta-xylene and 6.4 l/h of $N_2$. (Molar ratio meta-xylene/$N_2$=4).

Table 12 illustrates the conversion for both zeolites.

TABLE 12

| Reaction | Conversion (% wt) | |
|---|---|---|
| Time (Minutes) | MTW Zeolite of Example 6 | ZSM-12 Zeolite |
| 10 | 5.0 | 1.0 |
| 20 | 3.6 | 0.4 |
| 40 | 3.2 | 0.3 |
| 50 | 2.7 | 0.1 |
| 130 | 1.7 | 0.0 |
| 160 | 1.7 | 0.0 |

As shown, the catalyst according to the present invention exhibits excellent conversion for converting meta-xylene, as compared to the conventional ZSM-12 having less surface area and larger particle size.

In accordance with the foregoing examples, it is evident that the MTW zeolite of the present invention provides excellent activity and selectivity in the conversion and cracking of naphtha feedstock into desirable end products, as well as improved stability of the catalyst. Further, and particularly as illustrated in FIGS. 4 and 5, although the surface area and particle size parameters of MTW zeolite according to the invention nay be similar to ZSM-5 and USY conventional zeolite, the activity of the MTW zeolite according to the present invention is better than that of conventional zeolites toward the desired end products. In further accordance with the invention, the process for preparing the MTW zeolite yields a pure MTW zeolite composition in a shorter crystallization time than was previously obtained. Finally, the hydroconversion and/or hydrocracking procedures in accordance with the present invention yield high conversion rates toward desirable end products.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A catalyst composition having a crystalline aluminosilicate structure characterized by an x-ray diffraction pattern as follows:

| Interplanar Spacing D(Å) | Relative Intensity (I/I$_o$) |
|---|---|
| 12.09 | M |
| 11.26 | W |
| 10.15 | W |
| 9.81 | W |
| 7.48 | W |
| 6.09 | W |
| 4.77 | W |
| 4.73 | W |
| 4.30 | VS |
| 3.99 | W |
| 3.87 | VS |
| 3.73 | M |
| 3.66 | W |
| 3.50 | M |
| 3.38 | M |
| 3.21 | W |
| 3.06 | W | wherein said catalyst has a surface area of greater than or equal to about 300 m²/g and is active for conversion of hydrocarbon feedstock to provide increased fractions of isoparaffins and olefins.

2. A catalyst according to claim 1, wherein said catalyst has an average particle size of less than or equal to about 1 micron.

3. A catalyst according to claim 1, wherein said crystalline aluminosilicate is zeolite ZSM-12.

* * * * *